Nov. 20, 1934.   V. O. BEAM ET AL   1,981,218
CONTROL VALVE FOR HEATING SYSTEMS
Filed Oct. 28, 1933   2 Sheets-Sheet 2

INVENTORS
V. O. BEAM
N. T. BRANCHE
BY
Charles A. Lind
ATTORNEY.

Patented Nov. 20, 1934

1,981,218

UNITED STATES PATENT OFFICE 1,981,218

CONTROL VALVE FOR HEATING SYSTEMS

Vilynn O. Beam and Nelson T. Branche, Toledo, Ohio, assignors to Surface Combustion Corporation, Toledo, Ohio, a corporation of New York Application October 28, 1933, Serial No. 695,560

12 Claims. (Cl. 236—74)

This invention relates primarily to the art of automatic temperature regulation and more particularly to an automatic control system for a fuel supply valve.

In ordinary house heating apparatus making use of a fluid fuel such as gas, the fuel valve is automatically operated to fully open and close with the same frequency that the room thermostat calls respectively for "heat on" and "heat off". During the coldest weather, the frequency of such operation will be at a minimum since the capacity of the valve is initially chosen with cold weather requirements in mind; but as the weather moderates the frequency of opening and closing of the valve increases, as will be readily appreciated, due to excess capacity of the valve for prevailing weather conditions.

The present invention has for its object to provide a valve controlling system which shall embody means under the control of the room thermostat for automatically varying the degree of opening of the fuel valve between two positions, namely, fully open position and an open position which is less than fully open position, to the end that the fuel passed by the valve may more nearly approach that required by the prevailing weather conditions.

In the preferred embodiment of the invention, the opening of the valve is made dependent on the operation of two motors, one of which quickly opens the valve to a position less than fully open position and the other of which slowly varies the degree of opening of the valve between the said two positions. The combinational arrangement is such that following the quick opening of the valve the motor which slowly opens and closes the valve will operate to slowly open the valve as long as the thermostat calls for heat; will remain stationary when the thermostat is inactive between its two positions, namely, call-for-heat and no-call-for-heat positions, and will operate to slowly close the valve as long as the thermostat is in no-call-for-heat position, it being understood that when the valve has been slowly closed until the quick open position of the valve has been reached, the valve will automatically and quickly close since if the thermostat remains in the no-call-for-heat position for an excessively long time it is an indication that the valve in minimum open position is passing more than enough fuel to supply the prevailing heat requirements.

The various features of novelty and invention will more fully appear from the detailed description taken in connection with the accompanying drawings where the preferred form of the invention is shown.

Referring to the drawings.

Figure 1:
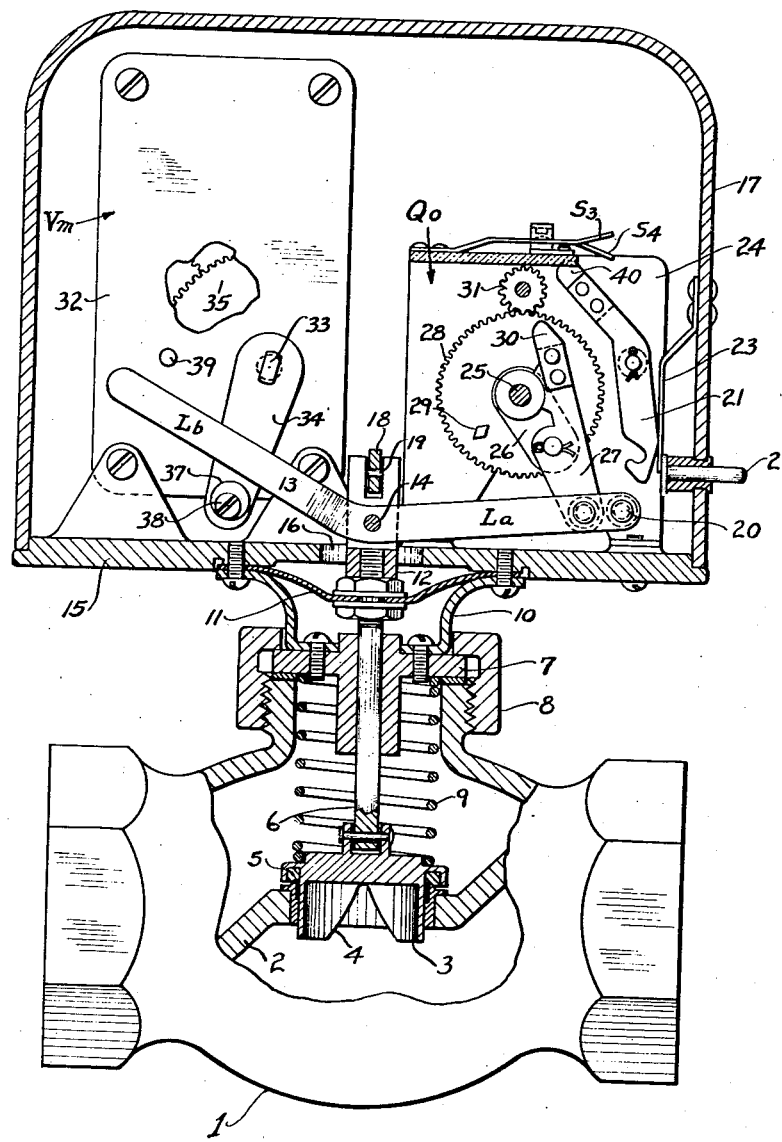
Fig. 1 is a sectional elevation of a valve operating mechanism embodying certain features of the present invention.

Referring to the drawings, 1 indicates a valve casing provided with the usual ported partition 2. Cooperating with the port in the partition is a sleeve valve 3 closed at its top and establishing communication between the opposite sides of the partition by inverted V-shaped notches or ports 4 in its opposite side walls. It is preferred that the valve be provided with the usual rim seat 5 for effectively sealing the port through the partition 2 when the valve is closed.

The valve is flexibly coupled to its valve stem 6 in any preferred way, and the stem extends upwardly through a sleeved head 7 which caps the neck of the valve casing and which is held in place by a collar nut 8. The valve is normally held in closed position by a spring 9 interposed between the head 7 and the top of the valve.

Secured to the top of the head 7 is a bowl-shaped bracket 10 across the top of which is disposed a flexible diaphragm 11 through which the valve stem extends, the diaphragm functioning merely as a flexible seal. Secured to the top of the valve stem is a head 12, which has a slotted top to receive a valve operating lever 13, the lever being pivoted to the head as at 14. Supported on the bowl bracket 10 is a deck plate 15 which is centrally apertured as at 16 for the passage of the valve stem bracket 12; and supported on the deck plate 15 is a housing 17.

Figure 4:
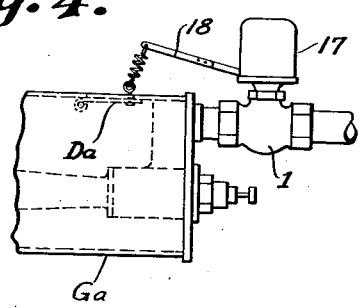
Fig. 4 is a fragmentary view of a gas burning apparatus showing one manner of applying the gas valve.

The valve 3 may be manually opened by a lever 18 which extends through the side wall of the housing 17 and which at its inner end is hingedly connected to the valve stem bracket 12 by a suitable hinge pin 19. As shown in Fig. 4 the lever 18 may also be used for operating a damper Da of a gas burning appliance Ga of which only a fragment is shown.

For descriptive purposes, the two arms of the lever 13 are identified by the reference characters La and Lb. At the outer end of the arm La is a pin 20 which when the valve 3 is elevated by the lever 18 will be engaged by the latch 21 when the latter is manually operated by a push pin 22 mounted in the side wall of the housing 17. A leaf spring 23 normally keeps the pin 22 in retracted position.

Supported on the deck plate 15 is a valve lifting mechanism generally indicated Qo, the purpose of this mechanism being to quickly open the valve 3 to a predetermined degree less than full open.

The supports for the mechanism Qo are upright plates 24 secured at their lower ends to the deck plate. Extending between and supported by the upright plates 24 is a shaft 25. Turnably mounted on this shaft is a link 26; and connecting the outer end of the link 26 and the lever arm La is a link 27. Also turnably mounted on the shaft 25 is a gear wheel 28 which is the last driven gear of a speed reduction gear train; and projecting laterally from the side of the gear is a crank pin 29.

When the gear wheel 28 is rotated in a counter-clockwise direction as viewed in Fig. 1, the crank pin 29 will engage the link 26 and rotate it in the same direction as the gear and hence the link 26 is in effect a crank arm. By thus rotating the crank arm 26, the lever arm La will be raised and the valve 3 opened to a certain degree. The degree to which the gear wheel 28 is free to rotate in a counter-clockwise direction is limited to that at which a finger 30 projecting upwardly from the link 27 will engage a switch S3 which forms a part of a motor controlling circuit.

Figure 2:
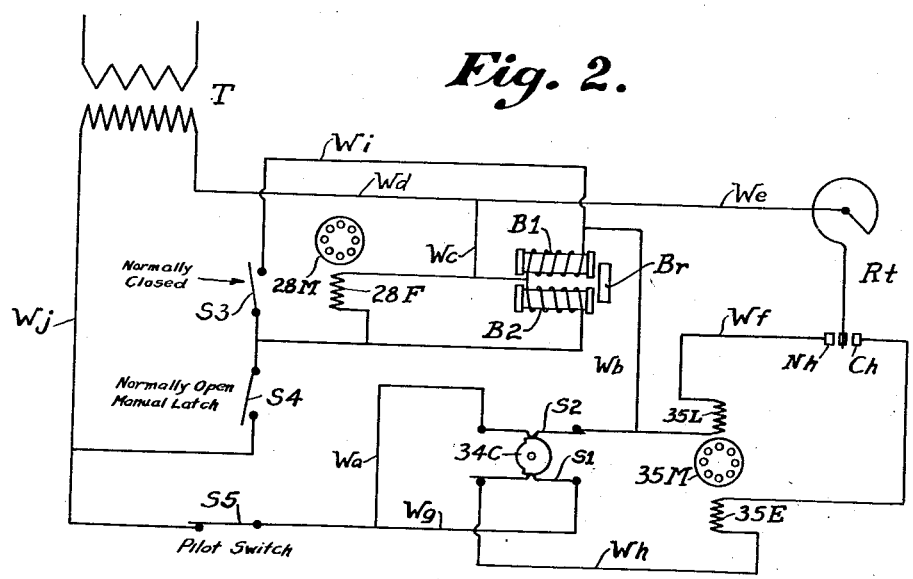
Fig. 2 is a schematic illustration of the electrical system employed in connection with the mechanism shown in Fig. 1.

The gear 28 is driven by a pinion 31 and for purposes of description this pinion may be considered as being secured to the rotor shaft of a high speed motor generally indicated at 28M in Fig. 2. Due to the high speed of the motor there will in actual practice be a number of speed reducing gears (not shown) between the pinion 31 and the gear 28.

The valve lifting mechanism thus far described is substantially the same as that disclosed in the pending application of V. O. Beam, Serial No. 598,575 filed March 14, 1932.

Also supported on the deck plate 15 is a valve operating mechanism generally indicated at Vm; and purpose of this mechanism is to slowly vary the degree of opening of the valve 3 between its minimum and maximum open positions.

The supports for the mechanism are two plate supports 32. Extending between and turnably supported by the plates 32 is a shaft 33. Affixed to one end of the shaft is a crank arm 34 and affixed to its other end is a switch operating cam indicated at 34C in Fig. 2.

Shaft 33 is driven by a gear wheel 35 affixed thereto. This gear wheel is the last driven gear of an ordinary speed reducing gear train of such great reduction that the gear wheel may be rotated very slowly indeed,— in fact so slowly that its rotation is scarcely perceptible to a casual observer. The gear train is not shown but the motor for driving it is indicated at 35M in Fig. 2.

Secured to the lower end of the crank arm 34 and projecting laterally therefrom is a fulcrum support 37 for the lever arm Lb. This fulcrum support is preferably an eccentric supported for adjustment by any suitable means as by a screw 38 which extends through the eccentric into the body of the crank arm 34. The lever arm Lb is shown as out of contact with the support 37 but this is of no particular significance since the valve is closed and is merely indicative of the fact that ample play is provided to insure proper seating of the valve 3.

When the lever arm La is lifted to raise the valve 3 from its seat, the lever arm Lb will, of course, engage the abutment 37 on the crank arm 34. It will be noted that the lever arms La and Lb are arranged at an angle to each other. This angularity is such that when the lever arm La has been raised by the mechanism Qo to elevate the valve 3, the other lever arm will be gradually raised as the crank arm 34 moves in a clockwise direction as viewed in Fig. 1.

As shown in Fig. 1, the crank arm 34 may be considered as at the limit of its movement as regards counter-clockwise direction, or in other words, in a valve lowering direction. At this point it may be pointed out that when the lever 18 is used to raise the valve 3, the lever arm Lb will engage beneath a pin 39 projecting from the plate 32 in order that the other arm La of the lever may be moved upwardly to an extent sufficient to allow the pin 20 at the outer end of the arm La to be engaged by the latch 21.

Assuming that the crank arm 34 remains in the position shown in Fig. 1, and that the crank link 26 is rotated to raise the lever arm La to raise the valve 3, it will be readily appreciated that the degree of opening of the valve may be increased or decreased by adjusting the cam 37 with respect to the axis of the shaft 33. Thus by turning the eccentric so as to lower the lever arm Lb, the degree to which the valve 3 will be opened by the crank link 26 will be reduced. The degree to which the valve will be opened by the operation of the crank link 26 will ordinarily be no more than is required to permit a sufficient flow of fuel to establish minimum operating capacity of the appliance Ga. This minimum opening of the valve may, for the purposes of this description, be considered as being ¼ of the capacity of the valve. Further opening of the valve, between ¼ open position and full open position, will be controlled by the travel of the crank arm 34 either in a clockwise or counter-clockwise direction.

Figure 3:
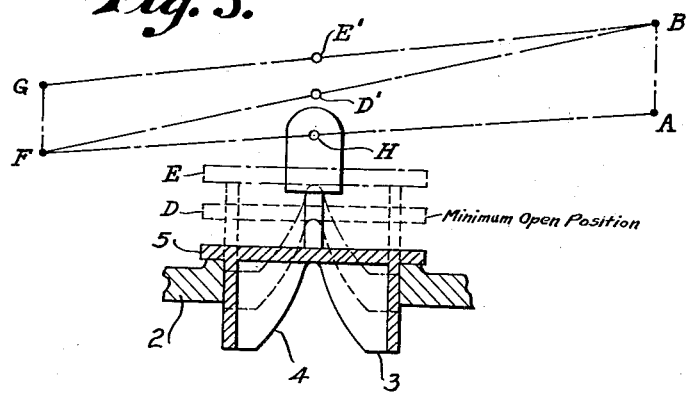
Fig. 3 is a diagrammatic illustration of the valve proper and its various operating limits.

Referring to the diagram in Fig. 3, the line AF may be taken as representing the position of the lever 13 when the valve 3 is closed; the line BF the position of the said lever when the lever arm La is lifted by the crank link 26, and the line BG the position of the said lever when the lever arm Lb has been elevated to its maximum position by the crank arm 34. The dotted line positions D and E of the valve correspond respectively to the points D' and E' on the two upper lines and the closed position of the valve corresponding to the point H on the bottom line. It will thus be seen that the distance FG represents that the lever arm Lb may be raised and lowered by turning movements of the crank arm 34.

Referring to Fig. 2, the motor 28M of the mechanism Qo is energizable for rotation in one direction only, namely, in a valve lifting direction; and the field for the motor is indicated at 28F. The motor 35M of the mechanism Vm is energizable for rotation in opposite directions; and to this end there are provided two fields 35L and 35E. When the circuit is through the field 35L, the motor operates in a direction to turn the crank arm 34 (Fig. 1) in a counter-clockwise direction whereby to lower the lever arm Lb and when the circuit is through the field 35E, the crank arm is turned in the opposite direction to elevate the said lever arm.

Associated with the cam 34C are two limit switches S1 and S2. A normally closed switch is indicated at S3, this switch being opened by the finger 30 at the upper end of the link 27. S4 indicates a normally open switch which is closed when engaged by finger 40 of the latch 21. S5 indicates a normally closed pilot safety switch, the switch being normally closed when the pilot for the gas burning appliance GA is burning.

When the motor 28M has been energized to rotate the gear wheel 28 in a direction to raise the valve 3, current to the motor is cut off and the motor is held against reversal of direction (under the influence of the spring 9 which tends to close the valve) by any suitable brake mechanism arranged to engage the rotor of the motor. The part indicated by reference character Br may be considered as the brake operating lever. This lever constitutes an armature disposed in front of two solenoids B1 and B2, the windings of which run in opposite directions and hence when both of the solenoids are energized they neutralize each other with the result that the lever armature Br is not attracted but when only one of the solenoids is energized the lever is attracted with the result that the brake is applied to the rotor of the motor 28M.

Rt indicates a room thermostat; Nh a no-call-for-heat contact, and Ch a call-for-heat contact of the thermostat.

For the purpose of further describing the mode of operation of the apparatus in connection with the diagram shown in Fig. 2, it will be assumed that the system is electrically active; that the room or space to be heated by the gas appliance Ga is at proper temperature and hence that the thermostat Rt is temporarily stationary between the two contact points Nh and Ch, and that the gas valve 3 is in its minimum open position D (D'), as indicated in Fig. 3.

When the thermostat is in the position indicated in Fig. 2, the motor 35M will be stationary since the thermostat is in series with both of the motor fields 35L and 35E and is in open position as regards these fields; the limit switch S2 will be closed; the motor field 28F will be shunted out because switch S3 is open, and the solenoid B1 but not solenoid B2 will be energized to attract the armature brake lever Br whereby to apply the brake to the motor 28M. The active circuit under such conditions is as follows: Transformer T; switch S5; wire Wa; switch S2; wire Wb; solenoid B1, and wires Wc and Wd to the transformer T.

Assuming now that for some reason the temperature of the room increases to such an extent that the thermostat moves to contact Nh which is the no-call-for-heat position. It may be assumed for that moment that in such case the valve 3 is required to be closed—as is the case when the crank arm is at the limit of its counter-clockwise rotation as viewed in Fig. 1. When the thermostat contacts Nh, the previously described circuit through the switch S2 and the solenoid B1 is not immediately interrupted, but the circuit then additionally includes wire We between the thermostat and the wire Wd; wire Wf; field 35L, and switch S2. As a result of this additional circuit, the motor 35M is rotated in such a direction that the cam 34C will rotate in a clockwise direction as viewed in Fig. 2, until the switch S2 is open. Thereupon the circuit to the solenoid B1 is broken with the result that the armature brake lever Br releases the brake on the motor 28M whereupon the valve spring 9 closes the valve 3 by overcoming the inertia of the rotor of the motor 28M and the gear train associated therewith. When the valve 3 is thus closed, the switch S3 automatically closes, it being remembered that it was held open by the finger 30 of the link 27. When the switch S2 opens, the circuit to the motor field 35L is broken and hence the motor 35M stops.

Assuming now that there is a call for heat and the thermostat moves to contact Ch. The circuit is then through transformer T; wire Wj; pilot switch S5; wire Wg; switch S1; wire Wh; field 35E; contact Ch; thermostat Rt and wires We and Wd to the transformer T. As a result of the field 35E being energized, the motor 35M will rotate in a direction to rotate the cam 34C in a counter-clockwise direction to close the switch S2. The motor field 28F then becomes energized, the circuit being as follows: Transformer T; wires Wd and Wc; field 28F; switch S3; wires Wi and Wb to switch S2; wire Wa, and switch S5 and wire Wj to transformer T.

During the time the field 28F is energized, both of the solenoids B1 and B2 are energized and hence they neutralize each other with the result that the armature lever Br is not attracted and the motor brake is not applied. When the motor 28M has rotated sufficiently to elevate the finger 30 of the link 27 into engagement with the switch S3 to open the latter, the circuit to the field 28F is broken and the solenoid B2 deenergized without, however, deenergizing the solenoid B1. Hence lever armature Br is attracted and the brake applied to the motor 28M in order to prevent the valve spring 9 from closing the valve.

In the meantime, unless the circuit to the field 35E is broken, the motor 35M keeps on running. Assuming the thermostat remains at contact Ch, the motor will eventually be stoped by the opening of the limit switch S1. The time interval between the closing of the switch S2 and the opening of the switch S1, or in other words, the time required to elevate the lever arm LB from the point F to G in Fig. 3, will be a substantial period in terms of minutes, say, for example, 25 minutes. In other words, if the thermostat remained at contact Ch for 25 minutes, it would require that much time for the motor 35M to open the valve from its minimum open position D' to a maximum open position E', as indicated in Fig. 3, it being understood that such opening is accomplished by movement of the crank arm 34 which is secured to the same shaft 33 as the cam 34C.

Suppose, however, that before the switch S1 opens, the thermostat moves away from the contact Ch as is shown in Fig. 2. In that case the motor 35M would stop running due to the circuit to the field 35E being broken. If, however, the degree to which the valve 3 was open beyond its minimum open position, was too much to insure the maintaining of a predetermined temperature as indicated by the thermostat, then the thermostat would move to contact Nh which is the no-call-for-heat position, whereupon the motor 35M will operate in a valve closing direction, the limit of such direction being the opening of the switch S2 whereupon the lever armature Br will release the brake on the motor 28M, with consequent closing of the valve due to the action of the valve spring 9.

What is claimed is:

1. In a valve operating mechanism, the combination of means for quickly opening the valve to a predetermined position less than fully open position, and means comprising a rotary electric motor for gradually varying the degree of opening of the valve between the said two positions.

2. In a valve operating system, the combination of means for quickly opening the valve to a predetermined position less than fully open position, and means comprising a reversible electric motor for gradually varying the degree of opening of the valve between the said two positions.

3. In a valve operating system, the combination of means including a motor for opening the valve to a chosen position less than fully open position, means including a motor for varying the degree of opening of the valve between the said two positions, means controlled by the operation of the second motor for permitting operation of the first motor, and means for controlling the operation of second motor from a remote point.

4. In a valve operating system, the combination of means including a one-way motor for opening the valve to a chosen position less than fully open position, means including a reversible motor for varying the degree of opening of the valve between the said two positions, means controlled by the operation of the reversible motor for permitting operation of the one-way motor, and means for controlling the operation of the reversible motor from a remote point.

5. In a valve operating mechanism, the combination of means comprising an electric motor for quickly opening the valve to a predetermined position less than fully open position, and means comprising a rotary electric motor for gradually varying the degree of opening of the valve between the said two positions.

6. In a valve operating mechanism, the combination of means including a prime mover for quickly opening the valve to a predetermined position less than fully open position, means including a prime mover for gradually varying the degree of opening of the valve between the said two positions, and means controlled by the operation of the second prime mover for permitting operation of the first prime mover.

7. In a valve operating system, the combination of means including a prime mover for quickly opening the valve to a predetermined position less than fully open position, means including a reversible motor for gradually varying the degree of opening of the valve between the said two positions, and means controlled by the operation of the reversible motor for permitting operation of the prime mover.

8. In a valve operating mechanism, the combination of a lever operatively connected intermediate its ends to the valve, means operatively associated with one end of the lever for quickly opening the valve to a predetermined position less than fully open position, a fulcrum for the other end of the lever, and means for gradually shifting said fulcrum in an arcuate path whereby to gradually vary the degree of opening of said valve between the said two positions.

9. In a valve operating mechanism, the combination of a lever operatively connected intermediate its ends to the valve, means operatively associated with one end of the lever for quickly opening the valve to a predetermined position less than fully open position, a fulcrum for the other end of the lever, and means for gradually shifting said fulcrum laterally from a lower to a higher position and vice versa whereby to gradually vary the degree of opening of the valve between said predetermined position and fully open position.

10. In a valve operating mechanism, the combination of means for quickly opening the valve to a predetermined position less than fully open position, and means comprising a rotary electric motor and a crank operated by said motor for gradually varying the degree of opening of the valve between the said two positions.

11. In a valve operating mechanism, the combination of means for quickly opening the valve to a predetermined position less than fully open position, and means comprising a rotary electric motor, a crank operated by said motor and a lever operated by said crank for gradually varying the degree of opening of the valve between the said two positions.

12. In a valve operating mechanism, the combination of means comprising an electric motor and a lever for quickly opening the valve to a position less than fully open position, and a reversible electric motor operatively connected to said lever for gradually varying the degree of opening of the valve between the said two positions.

VILYNN O. BEAM.
NELSON T. BRANCHE.